(12) United States Patent
Haapanen

(10) Patent No.: US 11,947,851 B2
(45) Date of Patent: *Apr. 2, 2024

(54) CONFIGURING PRINTING DEVICES

(71) Applicant: RICOH COMPANY, LTD., Tokyo (JP)

(72) Inventor: Tom Haapanen, Kitchener (CA)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/805,651

(22) Filed: Feb. 28, 2020

(65) Prior Publication Data

US 2021/0271437 A1 Sep. 2, 2021

(51) Int. Cl.
*G06F 3/12* (2006.01)

(52) U.S. Cl.
CPC .......... *G06F 3/1254* (2013.01); *G06F 3/1205* (2013.01); *G06F 3/1238* (2013.01); *G06F 3/1297* (2013.01)

(58) Field of Classification Search
None
See application file for complete search history.

(56) References Cited

U.S. PATENT DOCUMENTS

| 6,693,722 | B1 | 2/2004 | Mixer, Jr. | |
|---|---|---|---|---|
| 6,814,510 | B1 | 11/2004 | Sabbagh | |
| 8,291,312 | B1* | 10/2012 | Zhou | G06F 16/9574 |
| | | | | 715/234 |
| 10,791,246 | B2 | 9/2020 | Kato | |
| 2006/0023246 | A1 | 2/2006 | Vidyanand | |
| 2007/0146733 | A1 | 6/2007 | Kennis | |
| 2007/0229873 | A1 | 10/2007 | Kato | |
| 2011/0128572 | A1* | 6/2011 | Hosotsubo | G06F 3/1257 |
| | | | | 358/1.15 |

(Continued)

FOREIGN PATENT DOCUMENTS

| CA | 2546670 C | * 6/2005 |
|---|---|---|
| EP | 2759924 | 7/2014 |

(Continued)

OTHER PUBLICATIONS

Haapanen, U.S. Appl. No. 16/805,655, filed Feb. 28, 2020, Office Action, dated Feb. 19, 2021

(Continued)

*Primary Examiner* — Fan Zhang
(74) *Attorney, Agent, or Firm* — Hickman Becker Bingham Ledesma LLP

(57) ABSTRACT

An approach is provided for configuring printing devices. A configuration manager maintains configuration data for a printing device and provides the configuration data to a configuration agent executing on the printing device. The configuration agent applies the settings specified by the configuration data to the printing device and generates configuration identification data that uniquely identifies the settings. The configuration agent uses the configuration identification data to determine whether the current configuration of the printing device has changed. If so, then the configuration agent acquires and applies configuration data from the configuration manager.

20 Claims, 8 Drawing Sheets

(56) References Cited

U.S. PATENT DOCUMENTS

| | | | |
|---|---|---|---|
| 2011/0222114 A1* | 9/2011 | Wakabayashi | G06F 3/1204 |
| | | | 358/1.15 |
| 2011/0258299 A1 | 10/2011 | Herlein | |
| 2012/0233299 A1 | 9/2012 | Attanasio | |
| 2013/0128305 A1 | 5/2013 | Grabkowitz | |
| 2013/0163041 A1 | 6/2013 | Sato | |
| 2013/0235407 A1* | 9/2013 | Kobayashi | H04N 1/00344 |
| | | | 358/1.13 |
| 2014/0126016 A1 | 5/2014 | Namihira | |
| 2014/0240739 A1 | 8/2014 | Hattori | |
| 2014/0355067 A1 | 12/2014 | Asahara | |
| 2015/0172484 A1 | 6/2015 | Kanno | |
| 2015/0264198 A1* | 9/2015 | Kamiya | H04N 1/32122 |
| | | | 358/1.13 |
| 2015/0286452 A1 | 10/2015 | Kim | |
| 2016/0306596 A1 | 10/2016 | Yasuda et al. | |
| 2017/0243272 A1* | 8/2017 | Zakharov | G06Q 30/0621 |
| 2019/0087138 A1 | 3/2019 | Suzuki | |
| 2019/0359379 A9 | 11/2019 | Nelson et al. | |
| 2021/0271430 A1 | 9/2021 | Haapanen et al. | |
| 2021/0271436 A1 | 9/2021 | Haapanen et al. | |

FOREIGN PATENT DOCUMENTS

| | | | |
|---|---|---|---|
| JP | 2004-078392 A | | 3/2004 |
| JP | WO 2016030968 A1 | * | 3/2016 |
| JP | 2017-167971 A | | 9/2017 |
| JP | 2019/006099 | | 1/2019 |
| JP | 2021096396 | * | 9/2021 |

OTHER PUBLICATIONS

Haapanen, U.S. Appl. No. 16/805,654, filed Feb. 28, 2020, Office Action, dated Feb. 1, 2021.
Haapanen, U.S. Appl. No. 16/805,655, filed Feb. 28, 2020, Office Action, dated Sep. 30, 2020.
Haapanen, U.S. Appl. No. 16/805,655, filed Feb. 28, 2020, Final Office Action, dated Jun. 25, 2021.
The International Searching Authority, "Search Report" in Application No. PCT/JP2021/000689, dated Apr. 6, 2021, 15 pages.
Haapanen, U.S. Appl. No. 16/805,655, filed Feb. 28, 2020, Non-Final Rejection, dated Oct. 26, 2021.
Haapanen, U.S. Appl. No. 16/805,655, filed Feb. 28, 2020, Advisory Action, dated Sep. 9, 2021.
Haapanen, U.S. Appl. No. 16/805,654, filed Feb. 28, 2020, Notice of Allowance, dated Aug. 11, 2021.
Haapanen, U.S. Appl. No. 16/805,654, filed Feb. 28, 2020, Notice of Allowance and Fees Due, dated Sep. 2, 2021.
Haapanen, U.S. Appl. No. 16/805,655, filed Feb. 28, 2020, Advisory Action, dated Jun. 1, 2022.
Haapanen, U.S. Appl. No. 16/805,655, filed Feb. 28, 2020, Final Rejection, dated Mar. 9, 2022.
Haapanen, U.S. Appl. No. 16/805,655, filed Feb. 28, 2020, Notice of Allowance and Fees Due, dated Jul. 19, 2022.

* cited by examiner

FIG. 3A

- Configuration Selection Data 300
- Configuration Data 330
- Printing Device Data 350

FIG. 3B

Configuration Selection Data 300

| Customer | Printing Device Type | Configuration |
|---|---|---|
| Customer A | Type 1 | C1 |
| | Type 2 | C2 |
| | Type 3 | C3 |
| Customer B | Type 1 | Custom B-C1 |
| | Type 2 | C2 |
| | Type 3 | C3 |
| Customer C | Type 1 | C1 |
| | Type 2 | Custom C-C2 |
| | Type 3 | C3 |
| No Assigned Customer | Type 1 | C1 |
| | Type 2 | C2 |
| | Type 3 | C3 |

Configuration Key:
C1, C2, C3 = standard configurations
Customer B-C1, Customer C-C2 = customer-specific configurations

FIG. 3C

Printing Device Data 350

| Serial Number | Type | Customer ID | Configuration |
|---|---|---|---|
| SN1 | Type 1 | Customer A | C1 |
| SN2 | Type 2 | Customer B | C2 |
| SN3 | Type 1 | Customer C | C1 |
| SN4 | Type 3 | Customer C | C3 |
| SN5 | Type 2 | Customer C | Customer C-C2 |
| SN6 | Type 1 | Customer B | Customer B-C1 |
| SN7 | Type 1 | Customer A | |
| SN8 | Type 1 | Customer C | C1 |
| SN9 | Type 2 | Customer A | C2 |
| SN10 | Type 3 | Customer A | C3 |
| SN11 | Type 2 | Customer B | C2 |
| SN12 | Type 2 | Customer A | |
| SN13 | Type 1 | Customer A | C1 |
| SN14 | Type 1 | Customer A | C1 |
| SN15 | Type 3 | Customer C | |
| SN16 | Type 2 | Customer C | |
| SN17 | Type 3 | Customer B | |

Configuration Key:

C1, C2, C3 = standard configurations

Customer B-C1, Customer C-C2 = customer-specific configurations

Blank = printing device not yet configured

FIG. 3D

Printing Device Data 350

| Serial Number | Type | Customer ID | Configuration |
|---|---|---|---|
| SN1 | Type 1 | Customer A | C1 |
| SN2 | Type 2 | Customer B | C2 |
| SN3 | Type 1 | Customer C | C1 |
| SN4 | Type 3 | Customer C | C3 |
| SN5 | Type 2 | Customer C | Customer C-C2 |
| SN6 | Type 1 | Customer B | Customer B-C1 |
| SN7 | Type 1 | Customer A | |
| SN8 | Type 1 | Customer C | C1 |
| SN9 | Type 2 | Customer A | C2 |
| SN10 | Type 3 | Customer A | C3 |
| SN11 | Type 2 | Customer B | C2 |
| SN12 | Type 2 | Customer A | |
| SN13 | Type 1 | Customer A | C1 |
| SN14 | Type 1 | Customer A | C1 |
| SN15 | Type 3 | Customer C | C3 ⟵ 352 |
| SN16 | Type 2 | Customer C | |
| SN17 | Type 3 | Customer B | |

Configuration Key:

C1, C2, C3 = standard configurations

Customer B-C1, Customer C-C2 = customer-specific configurations

Blank = printing device not yet configured

CONFIGURING PRINTING DEVICES

RELATED APPLICATION DATA

This application is related to U.S. patent application Ser. No. 16/805,654 entitled "MANAGING THE CONFIGURATIONS OF PRINTING DEVICES", filed Feb. 28, 2020 and U.S. patent application Ser. No. 16/805,655 entitled "CONFIGURING PRINTING DEVICES USING A MOBILE DEVICE", filed Feb. 28, 2020, the contents all of which are incorporated by reference in their entirety for all purposes as if fully set forth herein.

FIELD

The technical field of the present disclosure relates to configuring printing devices.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

Printing devices are often sold unconfigured or with a basic configuration that does not have security settings enabled. In addition, printing devices that are sold with security settings enabled may be reconfigured by end users, leaving them in an insecure state. Device management systems are available to enable system administrators to secure, control and maintain the configurations of printing devices. These systems, however, require trained Information Technology (IT) staff. This leaves organizations that do not have dedicated IT staff with printing devices that are vulnerable to third party attacks.

SUMMARY

A computing device comprises one or more processors, one or more memories, a print process executing on the computing device for printing print jobs at the printing device, and a configuration agent executing on the printing device. The configuration agent is configured to receive, from a configuration manager via one or more computer networks, configuration data for the printing device, wherein the configuration data specifies a plurality of settings for the printing device and apply the plurality of settings from the configuration data to the printing device so that the printing device operates in accordance with the plurality of settings. The configuration agent is further configured to generate configuration identification data that uniquely corresponds to the plurality of settings specified by the configuration data and store the configuration identification data that uniquely identifies the plurality of settings specified by the configuration data in the one or more memories of the printing device.

The aforementioned approaches may also be implemented by one or more computer-implemented processes and non-transitory computer-readable media that store instructions which, when processed by one or more processed, implement the approach.

BRIEF DESCRIPTION OF THE DRAWINGS

Embodiments are depicted by way of example, and not by way of limitation, in the figures of the accompanying drawings and in which like reference numerals refer to similar elements.

DETAILED DESCRIPTION

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form in order to avoid unnecessarily obscuring the embodiments.

I. Overview
II. Printing Device Architecture
  A. Printing Device
  B. ERP System
  C. Configuration Manager
III. Configuring Printing Devices
  A. Initial Configuration
  B. Configuration Check and Reconfiguration
IV. Implementation Examples

I. Overview

An approach is provided for configuring printing devices. A configuration manager maintains configuration data for a printing device and provides the configuration data to a configuration agent executing on the printing device. The configuration agent applies the settings specified by the configuration data to the printing device and generates configuration identification data that uniquely identifies the settings. The configuration agent uses the configuration identification data to determine whether the current configuration of the printing device has changed. If so, then the configuration agent acquires and applies configuration data from the configuration manager.

As used herein, the term "configuration data" refers to data that specifies settings for printing devices. Example settings include, without limitation, paper/quality settings, effects settings, finishing settings, advanced settings, and security settings. Example security settings include, without limitation, HTTPS settings, IPP settings, TLS settings, encryption settings, FTP settings, WSD settings, RHPP settings, SNMP settings, etc. For example, security settings may pertain to user authentication for accessing a printing device, data overwrite and encryption on printing device storage, disabling certain communications protocols considered to be less secure, etc. As used herein, the term "configuration" refers to settings for a printing device and the term "current configuration" refers to settings currently applied to a printing device.

The approach described herein for configuring printing devices provides a technical solution to the technical problem of how to manage the configuration of printing devices to ensure that printing devices are operating with correct settings. The technical solution allows printing devices to apply and maintain a consistent and secure configuration without the need for dedicated IT staff.

II. Printing Device Configuration Architecture

Figure 1:
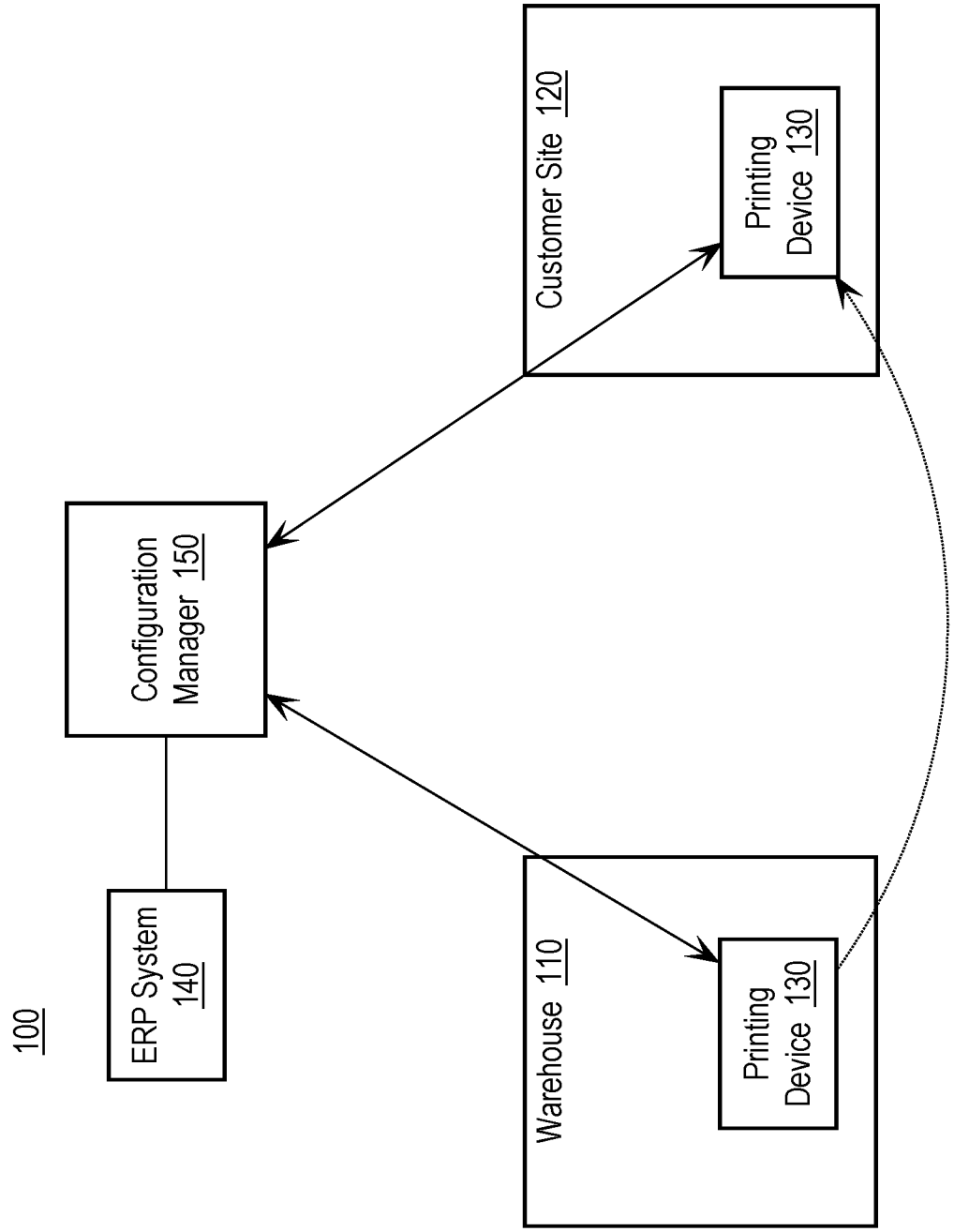
FIG. 1 is a block diagram that depicts a printing device configuration arrangement 100.

FIG. 1 is a block diagram that depicts a printing device configuration arrangement 100. Arrangement 100 includes a warehouse 110, a customer site 120, a printing device 130, an Enterprise Resource Planning (ERP) system 140, and a configuration manager 150. The warehouse 110 is any physical location where the printing device 130 is initially configured prior to being relocated to the customer site 120, as depicted in FIG. 1. The term "warehouse" is used herein for explanation purposes only and the warehouse 110 is not limited to a warehouse per se, and may include other physical locations such as a manufacturer, a distributor, etc. The customer site 120 is any physical location where the printing device 130 is in use. The term "customer site" is used herein for explanation purposes only and the customer site 120 is not limited to a customer site per se and may include other physical locations where the printing device 130 is in use.

The elements of arrangement 100 may be communicatively coupled via one or more wireless and/or wired computer networks of any type, and/or direct communications links that are not depicted in FIG. 1 for purposes of explanation. Arrangement 100 may include additional or fewer elements, depending upon a particular implementation. The approach for configuring printing devices is described in the context of configuring a single printing device 130 for purposes of explanation, but embodiments are applicable to configuring any number of printing devices.

A. Printing Device

Figure 2:
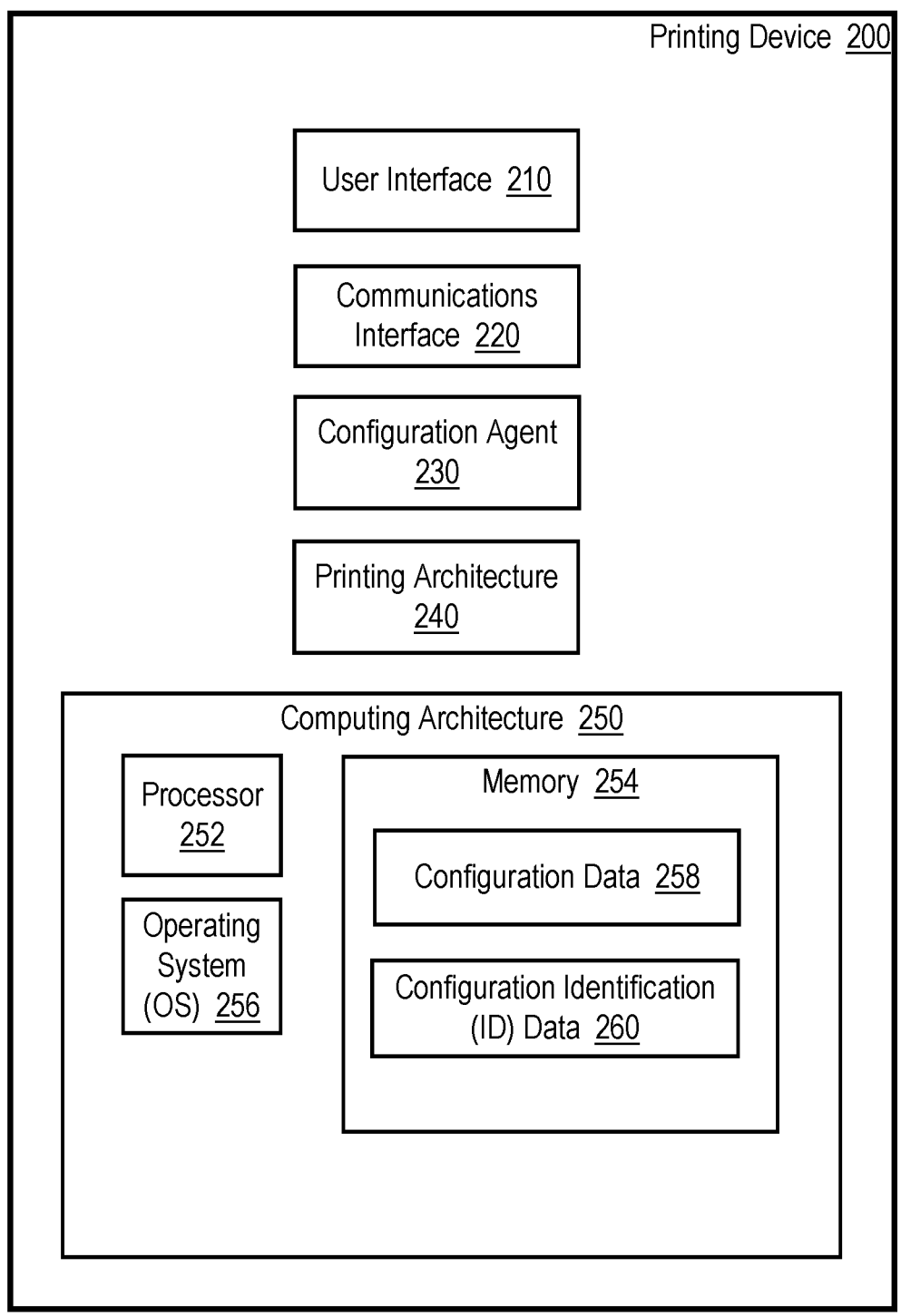
FIG. 2 is a block diagram that depicts an example implementation of a printing device.

The printing device 130 is a device that prints print jobs, such as electronic documents. Embodiments are applicable to any type of printing device and example printing devices include, without limitation, printers, copiers, facsimile machines, and Multi-Function Peripherals (MFPs). FIG. 2 is a block diagram that depicts an example implementation of a printing device 200 that includes a user interface 210, a communications interface 220, a configuration agent 230, a printing architecture 240, and a computing architecture 250.

The user interface 210 allows a user to input information to the printing device 200 and/or displays information to the user. For example, the user interface 210 may be implemented by a display screen, a control panel, a keyboard, a pointing device such as a mouse, or any combination thereof. The user interface 210 may include graphical user interface controls displayed on a touch screen that convey information a user about the functionality and status of the printing device and also allow a user to select functions and input information to the printing device 200.

The communications interface 220 provides for the exchange of data between the printing device 200 and other computing elements via wired, wireless, or direct connections. The configuration agent 230 configures (and reconfigures) the printing device 130 with configuration data, as described in more detail hereinafter. The configuration agent 230 may implement one or more Application Program Interfaces (APIs) supported by the configuration manager 150 and/or communicate with the configuration manager 150 via an HTTP or HTTPS connection. The configuration agent 230 may be implemented by one or more computer-implemented processes of any type. Furthermore, although the configuration agent 230 is depicted as a separate element for discussion purposes, the functionality provided by the configuration agent 230 may be integrated into other processes and/or elements on printing device 200.

The printing architecture 240 includes hardware elements, software elements, or any combination of hardware elements and software elements for printing electronic data, such as print jobs. This may include, for example, a paper transport, logic circuits, a toner cartridge, a photosensitive drum, a laser, one or more coronas, a fuser, an erase lamp, power supply, etc.

The computing architecture 250 includes a processor 252, a memory 254, and an OS 256. The processor 252 may be implemented by one or more microprocessors and associated computer hardware and/or computer software. The memory 254 may be implemented by volatile memory, non-volatile memory, or any combination of volatile and non-volatile memory. The OS 256 may be implemented by any type of operating system that may vary depending upon a particular implementation.

B. ERP System

The ERP system 140 includes data that maps printing devices to customers. The ERP system 140 may include other information, such as sales information, shipping dates, etc. The ERP system 140 may include a database for maintaining this information and a user interface to allow users to access and update the mapping data. The ERP system 140 may also include an interface so that the mapping data can be pushed to the configuration manager 150 or be obtained by the configuration manager 150.

C. Configuration Manager

The configuration manager 150 configures printing devices as described herein. The configuration manager 150 may be implemented by one or more processes, such as a cloud application, a server process, etc. For example, the configuration manager 150 may be a process hosted on a server of a business organization, hosted as a cloud service accessible via the Internet, etc. The configuration manager 150 may provide an Application Program Interface (API) for exposing the functionality and data of the configuration manager 150.

Figure 3:
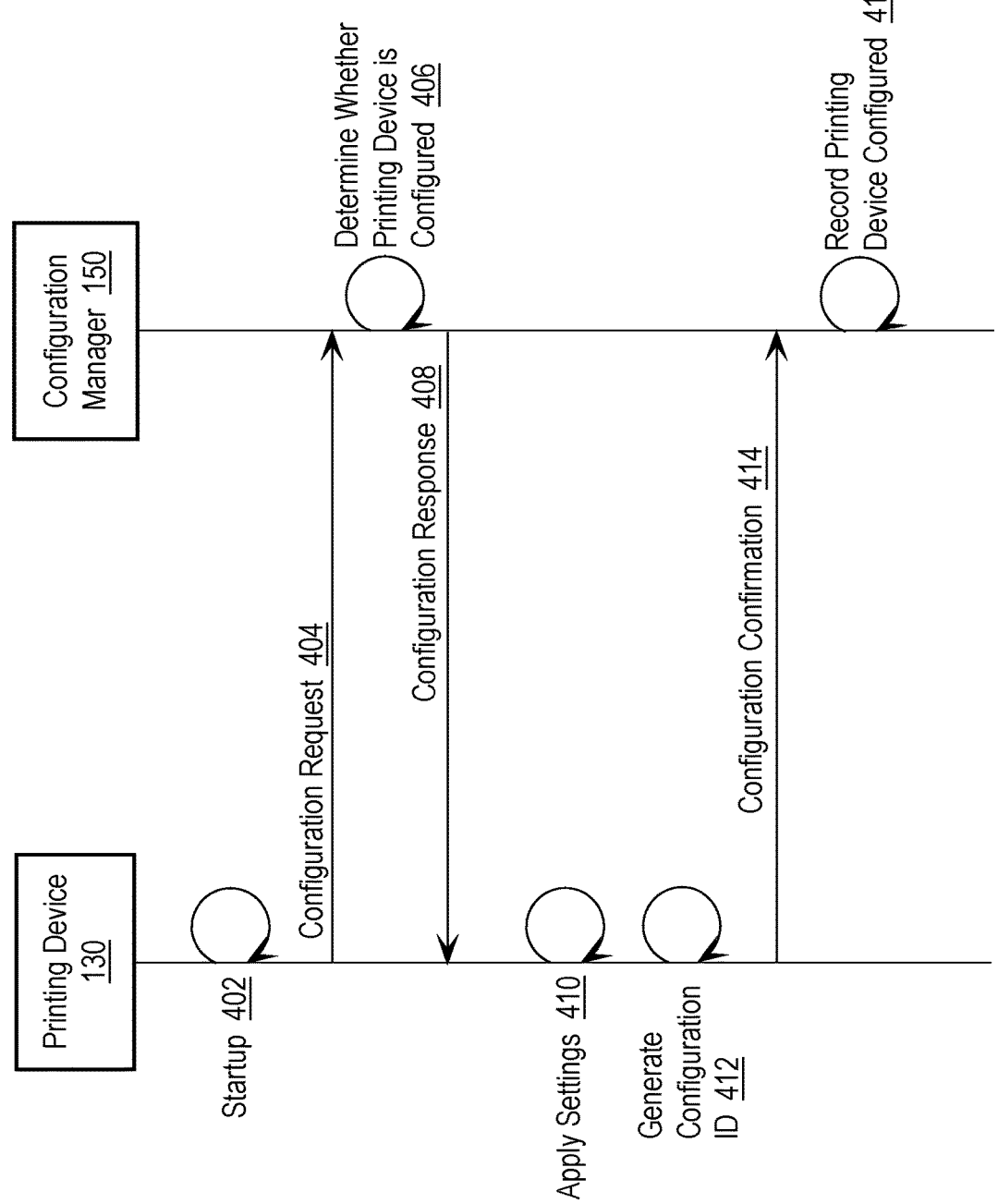
FIG. 3A is a block diagram that depicts configuration selection data, configuration data, and printing device data used by a configuration manager to manage the configuration of printing devices.
FIG. 3B is a block diagram that depicts example configuration selection data managed by the configuration manager.
FIG. 3C is a block diagram that depicts example printing device data managed by the configuration manager.
FIG. 3D is a block diagram that depicts the example printing device data after being updated by the configuration manager.

According to an embodiment, the configuration manager 150 uses different types of data to manage the configuration of printing devices. The data may be stored locally on a computing device on which the configuration manager 150 is executing, or remote from the configuration manager 150, for example, in a database management system, data repository, etc. FIG. 3A is a block diagram that depicts configuration selection data 300, configuration data 330, and printing device data 350 used by the configuration manager 150 to manage the configuration of printing devices. The configuration selection data 300, configuration data 330, and printing device data 350 may be maintained in any form or structure, depending upon a particular implementation, and although depicted in the figures and described herein as separate, may be combined in any manner.

The configuration selection data 300 specifies a configuration to be used for each type of printing device, for each customer. FIG. 3B is a block diagram that depicts example configuration selection data 300 managed by the configuration manager 150. In this example, there are three customers (Customer A, Customer B, Customer C) and three types of printing devices (Type 1, Type 2, Type 3). There are three standard configurations (C1, C2, C3) that correspond, respectively, to the three types of printing devices (Type 1, Type 2, Type 3). The standard configurations (C1, C2, C3) include settings that are appropriate for the corresponding type (Type 1, Type 2, Type 3) of printing device. For example, the standard configurations may include settings that are known to be stable with the corresponding type of printing device. Custom configurations are specified for certain customers and types of printing devices. These include a custom configuration (Custom B-C1) for Type 1 printing devices for Customer B, and a custom configuration (Custom C-C2) for Type 2 printing device for Customer C. The settings in the custom configurations may be established by customers based upon their operating environment, user preference, policies, etc. For example, a particular customer may implement a configuration that uses security settings to provide greater security than standard configurations. The configuration selection data 300 may include other data that may vary depending upon a particular implementation and embodiments are not limited to the example data depicted in the figures and described herein.

As described in more detail hereinafter, the configuration manager 150 uses the configuration selection data 300 to determine a configuration for a printing device. For example, the standard configuration C1 is used for Type 1 printing devices of Customer A and Customer C. As another example, the standard configuration C2 is used for Type 2 printing devices of Customer A and Customer B. As a further example, the custom configuration Custom B-C1 is used for Type 1 printing devices of Customer B and the custom configuration Custom C-C2 is used for Type 2 printing devices of Customer C. Although examples are described herein in the context of three customers and three types of printing devices, embodiments are not limited to these examples and are applicable to any number of customers and types of printing devices. The configuration selection data 300 may be created and maintained by an administrative user for example, using an application or a Web browser and the API of the configuration manager 150.

The configuration data 330 includes configuration data for any number and types of configurations, where each instance of configuration data includes a plurality of settings for a printing device. In the example configuration selection data 300 of FIG. 3B, the configuration selection data 300 includes configuration data for configurations C1, C2, C3, Custom B-C1, and Custom C-C2. The configuration data 330 may be stored in any form or format that may vary depending upon a particular implementation and may be defined by a user via a user interface of the configuration manager 150.

The printing device data 350 specifies data for printing devices including whether each printing device is configured and if so, with which configuration. FIG. 3C is a block diagram that depicts example printing device data 350 managed by the configuration manager 150. In this example, the printing device data 350 is depicted as a table, where each row of the table corresponds to a particular printing device and specifies a Serial Number, a Type, a customer ID, and a Configuration. The Serial Number is a number that uniquely identifies the printing device and although serial numbers are used herein for purposes of explanation, embodiments are not limited to using serial numbers per se and any data the uniquely identifies a printing device may be used. One example is a Media Access Control (MAC) address.

The Type is the type of printing device and in this example may have the value of Type 1, Type 2, or Type 3. The Customer ID is data that identifies an entity that controls or owns the printing device and although used herein for purposes of explanation, embodiments are not limited to Customer IDs per se and any data the uniquely identifies an entity that owns or controls a printing device may be used.

The Configuration is data that identifies the configuration for a printing device and in the present example may have the value of C1, C2, C3, Customer C-C2 or Customer B-C1. A blank or null value in cell means that a configuration has not yet been assigned to the printing device. This may occur, for example, when printing devices are sold to particular customers and corresponding entries created in the printing device data 350, but those printing devices have not yet been configured using the approach described herein.

The configuration manager 150 may provide a Web-based user interface for creating and managing the configuration selection data 300, the configuration data 330, and the printing device data 350. The Web-based user interface allows an administrative user to view the current configuration status of printing devices and to add, edit, and delete printing devices represented by the printing device data 350. For example, the user interface may allow a user of a client device to add a new printing device and specify the serial number, type, customer ID and configuration, if the printing device is already configured. This may be done at any time, for example, when a printing device is sold to a customer, configured at the warehouse 110, or deployed to the customer site 120. If the new printing device is not yet configured, then the administrator does not have to specify a configuration and the printing device will be automatically configured as described herein. The administrative user may also change any of the parameters, including Serial Number, Type, and Customer ID.

Alternatively, configuration selection data 300, the configuration data 330, and the printing device data 350 may be populated based upon data received from third-party systems, such as an Enterprise Resource Planning (ERP) system, or device management systems, such as Streamline NX, by Ricoh. The user interface may also include controls that allow a user to search for printing devices by serial number (or other identifying information), customer ID, printing device type, configuration ID, etc. According to an embodiment, the configuration manager 150 tracks all actions performed with respect to the configuration selection data 300, the configuration data 330, and the printing device data 350.

III. Configuring Printing Devices

The approach described herein for configuring printing devices provides for both initial configuration of printing devices and subsequent configuration checks and reconfiguration of printing devices. Embodiments are depicted in the figures and described herein in the context of an initial configuration being performed at the warehouse 110 and the configuration check and reconfiguration being performed at the customer site 120, but embodiments are not limited to this example and the initial configuration and subsequent configuration check and reconfiguration may be performed at any location.

A. Initial Configuration

Initial configuration of a printing device is performed when the configuration agent 230 is started on the printing device 130, which may occur, for example, after the printing device 130 is powered on or any other time when the configuration agent 230 is started. For example, at the warehouse 110 the printing device 130 may be powered on, the configuration agent 230 installed by an administrative user, and then the printing device 130 powered down and on again. Alternatively, after installation, the configuration agent 230 may immediately being executing. Embodiments are not limited to the example of the initial configuration being performed at the warehouse 110 and initial configuration may be performed anywhere, including at the customer site 120.

Figure 4:
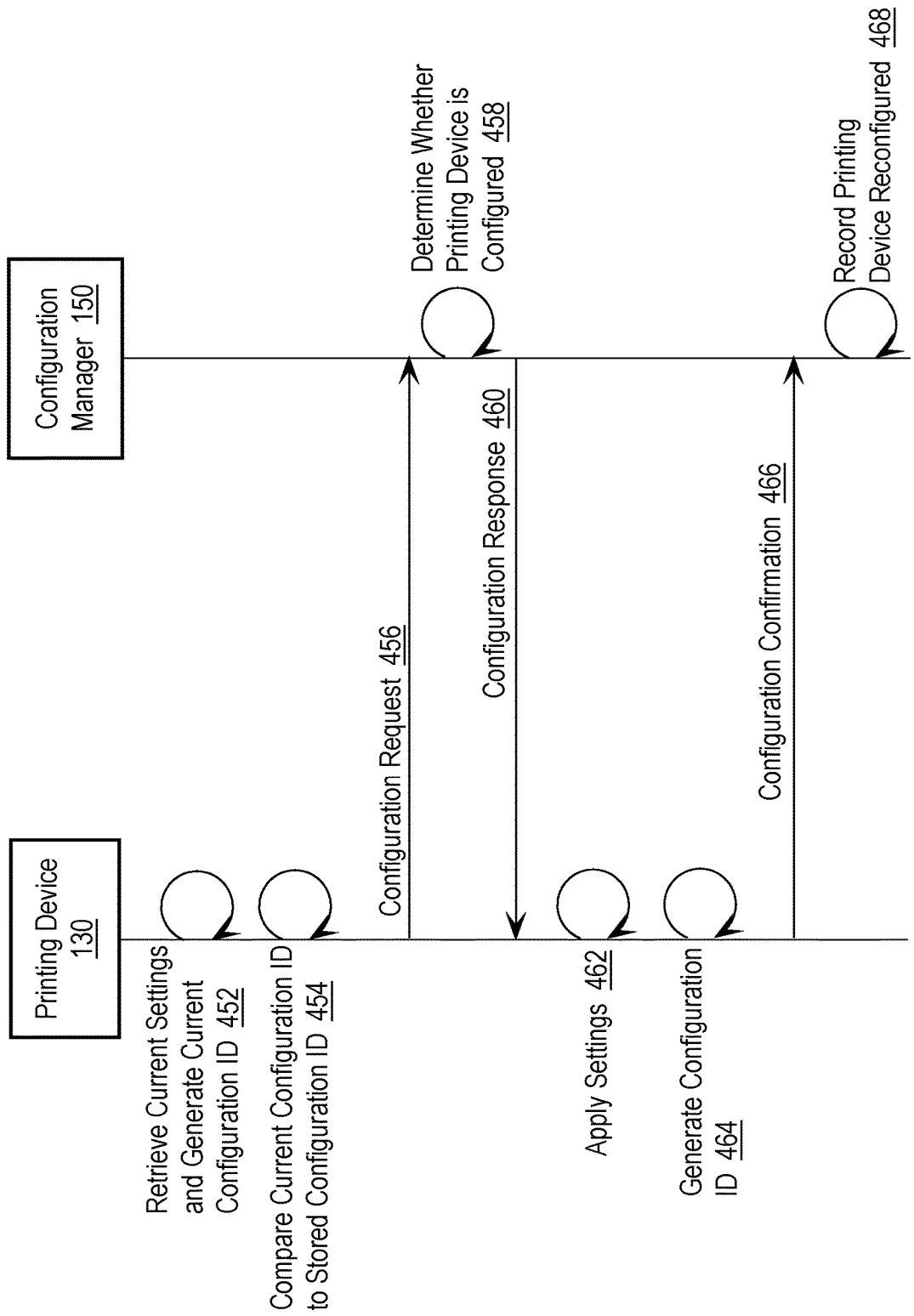
FIG. 4A is a message ladder diagram that depicts messages exchanged between the elements in arrangement during an initial configuration of the printing device.
FIG. 4B is a message ladder diagram that depicts messages exchanged between the printing device and the configuration manager during a reconfiguration check and reconfiguration.

FIG. 4A is a message ladder diagram 400 that depicts messages exchanged between the elements in arrangement 100 during an initial configuration of the printing device 130. Starting in step 402, the configuration agent 230 starts up, which may be after the printing device 130 is powered on, or after the configuration agent 230 is started on the printing device 130.

In step 404, a configuration request is transmitted to the configuration manager 150. For example, the configuration agent 230 may generate and transmit an HTTPS (or similar protocol) request to the configuration manager 150. According to an embodiment, the request specifies the serial number of the printing device 130. In the present example it is assumed that the serial number of the printing device 130 is SN15. According to an embodiment, in step 404 before transmitting the configuration request to the configuration manager 150, the configuration agent 230 determines whether the configuration ID data 260 in the memory 254 has a stored configuration ID. If so, then the printing device 130 was previously configured and the configuration check process described hereinafter with reference to FIG. 4B is performed instead of the initial configuration process of FIG. 4A. In the present example, it is presumed that the configuration ID data 260 in the memory 254 does not have a stored configuration ID and therefore was not previously configured.

In step 406, a determination is made whether the printing device 130 is currently configured. For example, the configuration manager 150 uses the serial number of the printing device 130 included in the request to identify a row in the printing device data 350 that corresponds to the serial number. The configuration manager 150 then examines the configuration field in the identified row to determine whether the printing device 130 is currently configured. The presence of a value in the configuration field indicates that the printing device 130 is currently configured with that configuration. A blank value indicates that the printing device 130 has not yet been configured, at least by the configuration manager 150. The printing device 130 may be configured and operating with a basic or standard configuration, e.g., installed at the factory.

If the configuration field contains a blank value, indicating that the printing device 130 has not yet been configured, the configuration manager 150 uses other information from the printing device data 350 and the configuration selection data 310 to determine a configuration for the printing device 130.

In the present example, the serial number of the printing device 130 is SN15. The row in the printing device data 350 that corresponds to the serial number SN15 does not have a value in the Configuration field, meaning that the printing device 130 has not yet been configured by the configuration manager 150. According to an embodiment, the configuration manager 150 uses the value of "Type 3" in the Type field and the value of "Customer C" in the Customer field to determine a configuration for the printing device 130 from the configuration selection data 300. More specifically, the configuration selection data 300 specifies that configuration C3 should be used for Customer C and Type 3 printing devices. In situations where a particular printing device does not have a value in the Customer field, the configuration manager 150 may use the configuration for the type of printing device specified in the "No Assigned Customer" portion of the configuration selection data 310. In situations where there is no value in the Type field, or not value in both the Customer and Type fields, the configuration manager 150 may assign a default configuration that may include, for example, a set of basis settings. According to an embodiment, the configuration manager 150 maintains model number to device type mapping data to allow the configuration manager 150 to use the model number of a printing device to determine a device type, and then use the configuration selection data 310 to select a configuration based upon the device type.

In step 408, a configuration response is generated and transmitted to the printing device 130. For example, the configuration manager 150 generates and transmits, to the configuration agent 230, a configuration response that includes the C3 configuration data, or a reference to the C3 configuration data. The configuration data may be in any form or format that varies depending upon a particular implementation. According to an embodiment, the configuration agent 230 stores the configuration data as configuration data 258 in the memory 254.

In step 410, the printing device 130 applies the settings for the configuration. For example, the configuration agent 230 applies the settings in the C3 configuration data. This may include the configuration agent 230 extracting the settings from the C3 configuration data and making one or more OS 256 calls to a controller of the printing device 130 to apply the settings. Upon completion of the calls, the printing device 130 begins operating with the settings specified by the C3 configuration data.

In step 412, the printing device 130 generates a configuration ID for the configuration. The configuration ID is data that uniquely corresponds to the settings in the C3 configuration data. Examples of the configuration ID data include, without limitation, a signature and a hash value. The configuration agent 230 may generate the configuration ID by processing the settings to create a signature, hash, checksum, etc. For example, the configuration agent 230 may provide the settings (or a subset thereof) as inputs to one or more one-way hash functions that generate hash results that uniquely correspond to the settings. The one-way hash functions may be implemented in the configuration agent 230 or may be external to the configuration agent 230 and invoked by the configuration agent 230. In this manner, the resulting configuration ID uniquely corresponds to the current configuration of the printing device 130. The configuration agent 230 stores the configuration ID in the configuration ID data 260 in the memory 254. According to an embodiment, the configuration agent 230 stores the configuration ID in the configuration ID data 260 in a secure portion of the memory 254, for example, a portion of the memory 254 that is separate from where the configuration data 258 is stored.

In step 414 a configuration confirmation is transmitted to the configuration manager 150. For example, the configuration agent 230 generates and transmits, to the configuration manager 150, a confirmation message confirming that the printing device 130 is now configured with the C3 configuration data. Alternatively, in the event of an error that prevents the configuration agent 230 from configuring the printing device 130, the configuration confirmation indicates that there was an error, and also additional details about the error, if available. If an error occurs, the configuration agent 230 may cause an error message to be displayed on the user interface 210 of the printing device 130. The configuration agent 230 may also cause one or more error messages, e.g., via email, a messaging service, etc., to be generated and transmitted to an administrative user to notify them that an error has occurred preventing the printing device 130 from being configured.

In step 416, the configuration manager 150 records that the printing device 130 has been configured. For example, the configuration manager 150 updates the Configuration field of the row in the printing device data 350 that corresponds to printing device 130 (SN 15) with the value "C3" to indicate that the printing device 130 is now configured with the C3 configuration data. FIG. 3D is a block diagram that depicts the example printing device data 350 after being updated by the configuration manager 150. The Configuration field 352 for the printing device 130 with serial number SN15 has been updated with the value of C3. The configuration manager 150 may also generate and transmit one or more message to, for example, the customer, a distributor, administrator, etc., indicate that the printing device 130 has been successfully configured. If the configuration confirmation indicates that an error occurred, then the configuration manager 150 does not update the printing device data 350 and instead may generate and transmit a notification to an administrative user, the customer, a distributor, etc. For example, the configuration manager 150 may cause a notification to be displayed on a user interface of a computing device on which the configuration manager 150 is executing. As another example, the configuration manager 150 may generate and transmit one or more error messages, e.g., via email, a messaging service, etc., to an administrative user to notify them that an error has occurred preventing the printing device 130 from being configured.

B. Configuration Checks and Reconfiguration

According to an embodiment, the configuration agent 230 is configured to determine whether the configuration has changed and if so, reconfigure the printing device 130. The configuration check and reconfiguration described herein may be performed upon satisfaction of various criteria. Example criteria include at specified times, periodically, or any time the configuration agent 230 is started, depending upon a particular implementation.

FIG. 4B is a message ladder diagram 450 that depicts messages exchanged between the printing device 130 and the configuration manager 150 during a reconfiguration check and reconfiguration. Starting in step 452, the current settings are retrieved, and a current configuration ID is generated. For example, the configuration agent 230 may make one or more OS 256 calls to a controller of the printing device 130 to retrieve the current settings being used by the printing device 130. The configuration agent 230 then generates a current configuration ID using the current settings, as previously described herein.

In step 454, the current configuration ID is compared to the stored configuration ID to determine whether the configuration of the printing device 130 has changed. This may include the configuration agent 230 retrieving the stored configuration ID from the configuration ID data 260 in the memory 254 and then comparing it to the current configuration ID. The configuration may change, for example, if an end user, third party attacker, virus or malware, etc., has changed the settings being used by the printing device 130.

Since both the current configuration ID and the stored configuration ID are generated based upon settings of the printing device 130, if the current configuration ID is the same as the stored configuration ID, then the settings configuration of the printing device 130 has not changed and the process of FIG. 4B is complete. If the current configuration ID is not the same as the stored configuration ID, then the configuration of the printing device 130 has changed and in step 456, a configuration request is generated and transmitted to the configuration manager 150. As was previously done in step 404, the configuration request specifies the serial number of the printing device 130. Continuing with the example of FIG. 4A, the serial number of the printing device 130 is SN15. The configuration agent 230 may also cause a notification to be displayed on the user interface 210 of the printing device 130, such as a warning that the configuration may have been compromised and to not use the printing device 130. The configuration agent 230 may also generate and transmit one or more messages to other locations, such as the configuration manager 150 to warn an administrative user of the condition of the printing device 130.

According to an embodiment, if the configuration agent 230 determines that there is no stored configuration ID in the configuration ID data 260 in the memory 254, then the configuration agent 230 proceeds to step 456 and generates and transmits a configuration request to the configuration manager 150. This may occur, for example, if the printing device 130 is not configured at the warehouse 110 before being deployed to the customer site 120.

In step 458 a determination is made whether the printing device 130 is currently configured. As in step 406, the configuration manager 150 uses the serial number of the printing device 130 included in the request to identify a row in the printing device data 350 that corresponds to the printing device 130.

Once the row has been identified, the configuration manager 150 examines the configuration field to determine whether the printing device 130 is currently configured. The presence of a value in the configuration field indicates that the printing device 130 is currently configured with that configuration. A blank value indicates that the printing device 130 has not yet been configured, at least from the perspective of the configuration manager 150. If the configuration field contains a blank value, then the configuration manager 150 uses the customer ID and printing device type values from the printing device data 350 to identify a specified configuration for the printing device 130, as previously described herein. In the present example, the Configuration field 352 (FIG. 3D) was updated to C3 when the printing device 130 was initially configured.

In step 460, a configuration response is generated and transmitted to the printing device 130. For example, the configuration manager 150 generates and transmits, to the configuration agent 230, a configuration response that includes the C3 configuration data, or a reference to the C3 configuration data. According to an embodiment, the configuration agent 230 stores the configuration data as configuration data 258 in the memory 254.

As an alternative to steps 456-460, the configuration agent 230 may re-apply the configuration stored in the configuration data 258 from the memory 254. This may be used in all cases, or in in situations where the configuration agent 230 cannot establish a connection with the configuration manager 150.

In step 462, the printing device 130 applies the settings for the configuration by extracting the settings from the C3 configuration data and making one or more OS 256 calls to a controller of the printing device 130 to apply the settings. Upon completion of the calls, the printing device 130 begins operating with the settings specified by the C3 configuration data.

In step 464, the printing device 130 generates and stores a configuration ID in the configuration ID data 260 in the memory 254 as previously described. This configuration ID may overwrite the previously stored configuration ID, or the original configuration ID may be maintained for forensic purposes.

In step 466 a configuration confirmation is transmitted to the configuration manager 150 that specifies whether the configuration was successful. In the event of an error that prevents the configuration agent 230 from configuring the printing device 130, the configuration confirmation may indicate that there was an error, and also additional details about the error, if available.

In step 468, the configuration manager 150 records that the printing device 130 has been configured. For example, the configuration manager 150 updates the Configuration field of the row in the printing device data 350 that corresponds to printing device 130 (SN 15) with the value "C3" to indicate that the printing device 130 is now configured with the C3 configuration data.

The approach for performing a configuration check and reconfiguration described herein provides several benefits. For example, it allows a printing device to automatically maintain a consistent, secure configuration with minimal involvement of IT personnel. It also allows the configuration of printing devices to be easily changed, even for a large number of printing devices. For example, a customer may decide to change the configuration for certain types of printing devices, e.g., to provide better security. This can be easily accomplished by the customer accessing the configuration manager 150 and updating the printing device data 350 for the customer's printing devices. The configuration agents then automatically update all of the printing devices without requiring IT staff to perform the updates.

IV. Implementation Examples

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that are persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
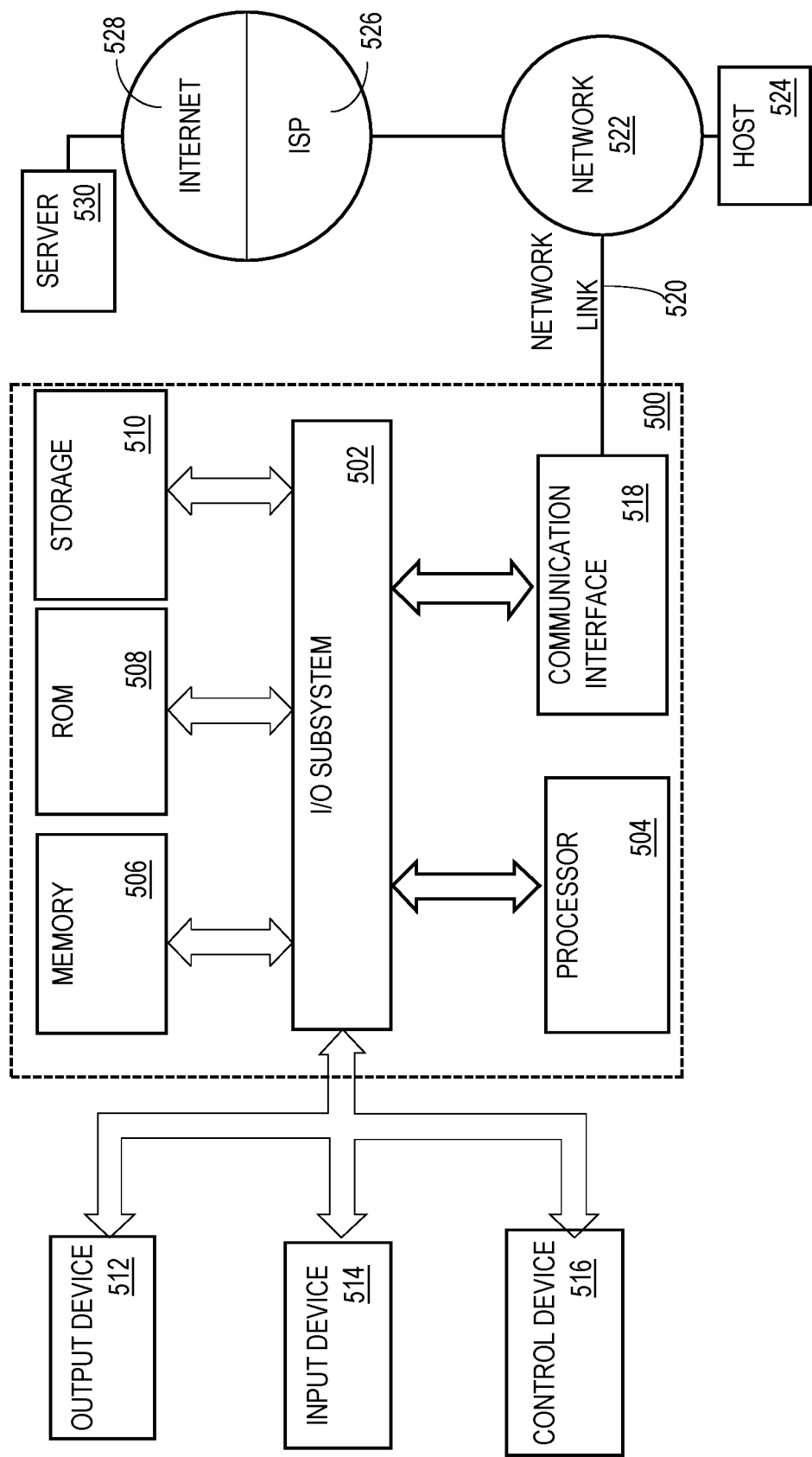
FIG. 5 is a block diagram that depicts an example computer system upon which embodiments may be implemented.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk or optical disk such as CD-ROM or DVD- ROM, and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 may be coupled to internet 528. Server 530 broadly represents any computer, data center, virtual machine or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

The invention claimed is:

1. A printing device comprising:
one or more processors;
one or more memories;
a print process executing on the printing device for printing print jobs at the printing device; and
a configuration agent executing on the printing device and configured to:
receive, from a configuration manager via one or more computer networks, first configuration data for the printing device, wherein the first configuration data specifies a first plurality of settings for the printing device,
apply the first plurality of settings from the configuration data to the printing device so that the printing device operates in accordance with the first plurality of settings,
generate, via an algorithm that uses as inputs one or more settings from the first plurality of settings specified by the first configuration data, first configuration identification data that uniquely corresponds to the first plurality of settings specified by the first configuration data,
store the first configuration identification data that uniquely identifies the first plurality of settings specified by the first configuration data in a secure portion of the one or more memories of the printing device that is separate from a portion of the one or more memories in which the first configuration data is stored;
generate second configuration identification data that uniquely corresponds to a second plurality of settings; and
compare the first configuration identification data retrieved from the secure portion of the memory with the second configuration identification data to determine whether a configuration of the printing device has been changed.

2. The printing device as recited in claim 1, wherein the configuration agent executing on the printing device is further configured to, upon satisfaction of one or more criteria:
retrieve a current plurality of settings being used by the printing device,
generate, via the algorithm that uses as inputs the current plurality of settings being used by the printing device, current configuration identification data that uniquely corresponds to the current plurality of settings being used by the printing device,
compare the current configuration identification data to the first configuration identification data,
in response to the current configuration identification data being different than the first stored configuration identification data, generate and transmit a request for configuration data to the configuration manager.

3. The printing device as recited in claim 2, wherein the one or more criteria include one or more of a startup of the configuration agent, an expiration of a specified amount of time, or a current time equalizing a specified time.

4. The printing device as recited in claim 1, wherein the first configuration identification data that uniquely corresponds to the first plurality of settings specified by the configuration data is one or more of signature data or hash results data.

5. The printing device as recited in claim 1, wherein the configuration agent executing on the printing device is further configured to:
determine whether the one or more memories comprise stored configuration identification data, and
in response to determining that the one or more memories do not comprise stored configuration identification data, generate and transmit a request for configuration data to the configuration manager.

6. The printing device as recited in claim 1, wherein:
the first plurality of settings specified by the configuration data for the printing device includes plurality of security settings, and
applying the first plurality of settings from the configuration data to the printing device includes applying the plurality of security settings to the printing device so that the printing device operates in accordance with the plurality of security settings.

7. The printing device as recited in claim 1, wherein the configuration agent executing on the printing device is further configured to generate and transmit to the configuration manager a request for the configuration data, wherein the request includes printing device identification data that uniquely identifies the printing device.

8. One or more non-transitory computer-readable media storing instructions which, when processed by one or more processors cause:
a configuration agent executing on a printing device to:
receive, from a configuration manager via one or more computer networks, configuration data for the printing device, wherein the configuration data specifies a plurality of settings for the printing device,
apply the plurality of settings from the configuration data to the printing device so that the printing device operates in accordance with the plurality of settings,
generate, via an algorithm that uses as inputs one or more settings from the plurality of settings specified by the configuration data, configuration identification data that uniquely corresponds to the plurality of settings specified by the configuration data, and
store the first configuration identification data that uniquely identifies the first plurality of settings specified by the configuration data in a secure portion of the one or more memories of the printing device that is separate from a portion of the one or more memories in which the configuration data is stored;
generate second configuration identification data that uniquely corresponds to a second plurality of settings; and
compare the first configuration identification data retrieved from the secure portion of the memory with the second configuration identification data to determine whether a configuration of the printing device has been changed.

9. The one or more non-transitory computer-readable media as recited in claim 8, wherein processing of the instructions by the one or more processors further causes the configuration agent executing on the printing device to, upon satisfaction of one or more criteria:
retrieve a current plurality of settings being used by the printing device,
generate, via the algorithm that uses as inputs the current plurality of settings being used by the printing device, current configuration identification data that uniquely corresponds to the current plurality of settings being used by the printing device,
compare the current configuration identification data to the first configuration identification data, in response to the current configuration identification data being different than the stored configuration identification data, generate and transmit a request for configuration data to the configuration manager.

10. The one or more non-transitory computer-readable media as recited in claim 9, wherein the one or more criteria include one or more of a startup of the configuration agent, an expiration of a specified amount of time, or a current time equalizing a specified time.

11. The one or more non-transitory computer-readable media as recited in claim 8, wherein the configuration identification data that uniquely corresponds to the first plurality of settings specified by the configuration data is one or more of signature data or hash results data.

12. The one or more non-transitory computer-readable media as recited in claim 8, wherein processing of the instructions by the one or more processors further causes the configuration agent executing on the printing device to:
determine whether the one or more memories comprise stored configuration identification data, and
in response to determining that the one or more memories do not comprise stored configuration identification data, generate and transmit a request for configuration data to the configuration manager.

13. The one or more non-transitory computer-readable media as recited in claim 8, wherein:
the first plurality of settings specified by the configuration data for the printing device includes a plurality of security settings, and
applying the first plurality of settings from the configuration data to the printing device includes applying the plurality of security settings to the printing device so that the printing device operates in accordance with the plurality of security settings.

14. The one or more non-transitory computer-readable media as recited in claim 8, wherein processing of the instructions by the one or more processors further causes the configuration agent executing on the printing device to generate and transmit to the configuration manager a request for the configuration data, wherein the request includes printing device identification data that uniquely identifies the printing device.

15. A computer-implemented method comprising:
a configuration agent executing on a printing device:
receiving, from a configuration manager via one or more computer networks, configuration data for the printing device, wherein the configuration data specifies a plurality of settings for the printing device,
applying the plurality of settings from the configuration data to the printing device so that the printing device operates in accordance with the plurality of settings,
generating, via an algorithm that uses as inputs one or more settings from the plurality of settings specified by the configuration data, configuration identification data that uniquely corresponds to the plurality of settings specified by the configuration data, and
store the first configuration identification data that uniquely identifies the first plurality of settings specified by the configuration data in a secure portion of the one or more memories of the printing device that is separate from a portion of the one or more memories in which the configuration data is stored;
generate second configuration identification data that uniquely corresponds to a second plurality of settings; and
compare the first configuration identification data retrieved from the secure portion of the memory with the second configuration identification data to determine whether a configuration of the printing device has been changed.

16. The computer-implemented method as recited in claim 15, further comprising the configuration agent executing on the printing device, upon satisfaction of one or more criteria:
retrieving a current plurality of settings being used by the printing device,
generating, via the algorithm that uses as inputs the current plurality of settings being used by the printing device, current configuration identification data that uniquely corresponds to the current plurality of settings being used by the printing device,
comparing the current configuration identification data to the first configuration identification data,
in response to the current configuration identification data being different than the stored configuration identification data, generating and transmitting a request for configuration data to the configuration manager.

17. The computer-implemented method as recited in claim 16, wherein the one or more criteria include one or more of a startup of the configuration agent, an expiration of a specified amount of time, or a current time equalizing a specified time.

18. The computer-implemented method as recited in claim 15, wherein the configuration identification data that uniquely corresponds to the first plurality of settings specified by the configuration data is one or more of signature data or hash results data.

19. The computer-implemented method as recited in claim 15, further comprising the configuration agent executing on the printing device:
determining whether the one or more memories comprise stored configuration identification data, and
in response to determining that the one or more memories do not comprise stored configuration identification data, generating and transmitting a request for configuration data to the configuration manager.

20. The computer-implemented method as recited in claim 15, wherein:
the first plurality of settings specified by the configuration data for the printing device includes a plurality of security settings, and
applying the first plurality of settings from the configuration data to the printing device includes applying the plurality of security settings to the printing device so that the printing device operates in accordance with the plurality of security settings.

\* \* \* \* \*